United States Patent
Han et al.

(10) Patent No.: US 10,803,781 B2
(45) Date of Patent: Oct. 13, 2020

(54) COLOR FILTER SUBSTRATE ASSEMBLY, MANUFACTURING METHOD THEREOF, AND DISPLAY APPARATUS AND DISPLAY METHOD THEREOF

(71) Applicants: Beijing BOE Optoelectronics Technology Co., Ltd., Beijing (CN); BOE TECHNOLOGY GROUP CO., LTD., Beijing (CN)

(72) Inventors: Shuai Han, Beijing (CN); Jian Wang, Beijing (CN); Jianyun Xie, Beijing (CN); Xuechao Song, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/583,982

(22) Filed: Sep. 26, 2019

(65) Prior Publication Data

US 2020/0020267 A1 Jan. 16, 2020

Related U.S. Application Data

(62) Division of application No. 15/098,426, filed on Apr. 14, 2016, now Pat. No. 10,607,523.

(30) Foreign Application Priority Data

Jul. 17, 2015 (CN) .......................... 2015 1 0425438

(51) Int. Cl.
*G09G 3/20* (2006.01)
*G02B 5/20* (2006.01)

(52) U.S. Cl.
CPC ............ *G09G 3/2003* (2013.01); *G02B 5/201* (2013.01); *G09G 2300/0452* (2013.01); *G09G 2320/0242* (2013.01)

(58) Field of Classification Search
CPC ......... G09G 3/2003; G09G 2300/0452; G09G 2320/0242; G02B 5/201
See application file for complete search history.

(56) References Cited

U.S. PATENT DOCUMENTS

| 8,354,986 B2 | 1/2013 | Lin et al. |
| 2008/0225055 A1 | 9/2008 | Yu et al. |

(Continued)

FOREIGN PATENT DOCUMENTS

| CN | 202049252 U | 11/2011 |
| CN | 103376592 A | 10/2013 |

(Continued)

OTHER PUBLICATIONS

First Office Action from Chinese Patent Application No. 201510425438.9, dated Jul. 3, 2017, 11 pages.

(Continued)

*Primary Examiner* — Sahlu Okebato
(74) *Attorney, Agent, or Firm* — Westman, Champlin & Koehler, P.A.

(57) ABSTRACT

A display method for a display apparatus is disclosed. The display apparatus includes pixel sets each including a luminance increasing pixel and display pixels. Each of the luminance increasing pixel and the display pixels consists of sub-pixels of a first primary color, a second primary color and a third primary color. The display method includes acquiring gray scale values of the sub-pixels in the display pixels; determining, according to the gray scale values, gray scale values of the sub-pixels in the luminance increasing pixels; inputting, according to the gray scale values of the (Continued)

sub-pixels in the luminance increasing pixels, a luminance increasing data signal to the luminance increasing pixel such that the luminance increasing pixel emits light of a white gray scale; and inputting, according to the gray scale values of the sub-pixels in the display pixels, data signals for the primary colors, to the display pixels.

2 Claims, 3 Drawing Sheets

(56) References Cited

U.S. PATENT DOCUMENTS

| | | | | |
|---|---|---|---|---|
| 2013/0242237 | A1* | 9/2013 | Nagato | G02F 1/1362 349/105 |
| 2015/0015619 | A1* | 1/2015 | Aoki | G09G 3/3696 345/690 |
| 2015/0310792 | A1 | 10/2015 | Fukushima et al. | |
| 2016/0246107 | A1 | 8/2016 | Han et al. | |
| 2016/0329010 | A1 | 11/2016 | Sun et al. | |

FOREIGN PATENT DOCUMENTS

| | | |
|---|---|---|
| CN | 104765194 A | 7/2015 |
| TW | 200839698 A | 10/2008 |

OTHER PUBLICATIONS

Second Office Action for Chinese Patent Application No. 201510425438. 9, dated Dec. 1, 2017, 9 pages.

USPTO—issued prosecution history for U.S. Appl. No. 15/098,426, including: Non-Final Rejection dated Jun. 27, 2019, 10 pages; Final Rejection dated Feb. 26, 2019, 12 pages; Non-Final Rejection dated Sep. 2018, 12 pages; Final Rejection dated Jun. 29, 2018, 12 pages; Non-Final Rejection dated Jan. 9, 2018, 10 pages; Requirement for Restriction/Election dated Oct. 13, 2017, 5 pages; 61 pages total.

\* cited by examiner

COLOR FILTER SUBSTRATE ASSEMBLY, MANUFACTURING METHOD THEREOF, AND DISPLAY APPARATUS AND DISPLAY METHOD THEREOF

CROSS-REFERENCE TO RELATED APPLICATION

This application is a divisional application of U.S. application Ser. No. 15/098,426, filed on Apr. 14, 2016, which claims the benefit of Chinese Patent Application No. 201510425438.9 filed on Jul. 17, 2015 in the State Intellectual Property Office of China, the disclosures of which are incorporated herein by reference in their entireties.

BACKGROUND

1. Technical Field

Embodiments of the present invention relate to the field of display technology, and particularly to a color filter substrate assembly, a manufacturing method thereof, and a display apparatus and a display method thereof.

2. Description of the Related Art

At present, when a display apparatus is manufactured, generally a transmittance increasing pixel, i.e. a white (W) sub-pixel, is included on the basis of three conventional red (R), green (G), and blue (B) sub-pixels, in order to increase a transmittance of the display apparatus. Since this transmittance increasing pixel emits light of a white gray scale, it can function to increase a luminance, thereby solving a problem of a relatively low transmittance of the display apparatus.

However, during manufacturing of a color filter substrate assembly of the abovementioned display apparatus, it is necessary to firstly manufacture the conventional R, G, B sub-pixels by a mask patterning process, and then carry out one additional mask process for a W sub-pixel. In other words, it is necessary to add three additional steps (application, exposure, and development).

SUMMARY

In accordance with an aspect, embodiments of the present invention provide a color filter substrate assembly comprising a color filter layer. The color filter layer comprises pattern units arranged in an array, and each of the pattern units comprises a pattern subunit of a first primary color, a pattern subunit of a second primary color, a pattern subunit of a third primary color and a color mixture pattern subunit which are arranged in sequence, wherein the color mixture pattern subunit consists of patterns of the first primary color, the second primary color, and the third primary color, and the patterns of the first primary color, the second primary color and the third primary color do not completely overlap or are not completely coincident.

In accordance with another aspect, embodiments of the present invention also provide a method of manufacturing a color filter substrate assembly, and the method comprises: forming a color filter layer on a substrate. The forming the color filter layer comprises:

forming patterns of a first primary color on the substrate, wherein the patterns of the first primary color are located in a region where a pattern subunit of the first primary color is positioned, and a first region of a color mixture pattern subunit, respectively;

forming patterns of a second primary color on the substrate, wherein the patterns of the second primary color are located in a region where a pattern subunit of the second primary color is positioned, and a second region of the color mixture pattern subunit, respectively; and forming patterns of a third primary color on the substrate, wherein the patterns of the third primary color are located in a region where a pattern subunit of the third primary color is positioned, and a third region of the color mixture pattern subunit, respectively, wherein the first region, the second region, and the third region of the color mixture pattern subunit do not completely overlap or are not completely coincident.

In accordance with a further aspect, embodiments of the present invention also provide a display apparatus comprising the abovementioned color filter substrate assembly, and the display apparatus comprises:

pixels, each of the pixels comprising a first sub-pixel, a second sub-pixel, a third sub-pixel, and a fourth sub-pixel, the first sub-pixel comprising the pattern subunit of the first primary color in the color filter substrate assembly, the second sub-pixel comprising the pattern subunit of the second primary color in the color filter substrate assembly, the third sub-pixel comprising the pattern subunit of the third primary color in the color filter substrate assembly, and the fourth sub-pixel comprising the color mixture pattern subunit in the color filter substrate assembly.

In accordance with a still another aspect, embodiments of the present invention also provide a display method for the abovementioned display apparatus. The display method comprises:

during driving of any one of the pixels in the display apparatus, inputting a data signal for the first primary color to the first sub-pixel, inputting a data signal for the second primary color to the second sub-pixel, inputting a data signal for the third primary color to the third sub-pixel, and inputting a luminance increasing data signal to the fourth sub-pixel such that the fourth sub-pixel emits light of a white gray scale.

In accordance with a still further aspect, embodiments of the present invention also provide a display method for a display apparatus. The display apparatus comprises: a plurality of pixel sets arranged repeatedly, each of the plurality of pixel sets comprising a luminance increasing pixel and N display pixels, wherein each of the luminance increasing pixel and the N display pixels consists of a sub-pixel of a first primary color, a sub-pixel of a second primary color, and a sub-pixel of a third primary color, and N>0.

During driving of any one of the plurality of pixel sets, the display method comprises:

acquiring gray scale values of the sub-pixels in each of the N display pixels;

determining, according to the gray scale values of the sub-pixels in each of the N display pixels, gray scale values of the sub-pixels in the luminance increasing pixel;

inputting, according to the gray scale values of the sub-pixels in the luminance increasing pixel, a luminance increasing data signal to the luminance increasing pixel such that the luminance increasing pixel emits light of a white gray scale; and inputting, according to the gray scale values of the sub-pixels in the each of the N display pixels, a data signal for the first primary color, a data signal for the second primary color, and a data signal for the third primary color, to the each of the N display pixels.

DETAILED DESCRIPTION OF THE EMBODIMENTS

Figure 1:
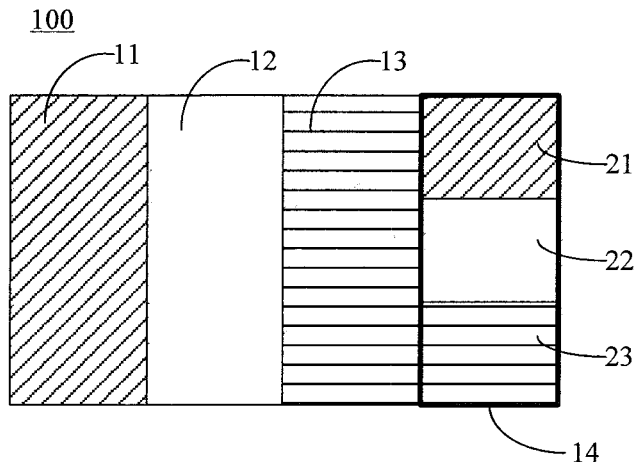
FIG. 1 is a schematic diagram of a color filter substrate assembly according to an embodiment of the present invention.

A further description of the invention will be made in detail as below with reference to embodiments of the present invention taken in conjunction with the accompanying drawings. The following embodiments are intended to explain the present invention and the present invention should not be construed as being limited to the embodiment set forth herein.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present invention provide a color filter substrate assembly. The color filter substrate assembly specifically comprises a color filter layer comprising pattern units arranged in an array, and each of the pattern units comprises a pattern subunit of a first primary color, a pattern subunit of a second primary color, a pattern subunit of a third primary color and a color mixture pattern subunit which are arranged in sequence, wherein the color mixture pattern subunit consists of patterns of the first primary color, the second primary color and the third primary color, and the patterns of the first primary color, the second primary color and the third primary color do not completely overlap or are not completely coincident.

As an example, as shown in FIG. 1, the color filter substrate assembly 100 comprises a color filter layer. The color filter layer comprises pattern units arranged in an array. Each of the pattern units comprises: a pattern subunit 11 of a first primary color, a pattern subunit 12 of a second primary color, a pattern subunit 13 of a third primary color, and a color mixture pattern subunit 14, which are arranged in sequence. The color mixture pattern subunit 14 consists of patterns of the first primary color, the second primary color and the third primary color, and the patterns of the first primary color, the second primary color and the third primary color do not completely overlap or are not completely coincident.

The first primary color, the second primary color, and the third primary color may be red R, green G, and blue B, respectively. The color mixture pattern subunit 14 consisting of patterns of the first primary color R, the second primary color G and the third primary color B displays a color of a white gray scale, under the action of a drive voltage according to an additive color mixing principle, after the three primary colors are mixed together, thereby increasing the transmittance. In other words, in each of the pattern units, there is one color mixture pattern subunit 14 provided for increasing the transmittance. As a result, the transmittance of a display apparatus provided with the color filter substrate assembly 100 can be increased by 25%.

Of course, there are many manners of arrangements of the pattern units, and the number and size of the pattern units and the number and sizes of the pattern subunits 11 of the first primary color, the pattern subunits 12 of the second primary color, the pattern subunits 13 of the third primary color and the color mixture pattern subunits 14 may be respectively set according to actual situation. They are not limited in the embodiments of the present invention.

Optionally, the patterns of the first primary color, the second primary color and the third primary color in the color mixture pattern subunit 14 have the same size. In this way, the color mixture pattern subunit 14 can display a more uniform color of the white gray scale after the three primary colors are mixed together.

In some embodiments, as shown in FIG. 1, the patterns of the first primary color, the second primary color and the third primary color in the color mixture pattern subunit 14 do not coincide with one another or do not overlap one another. If any two of the patterns of the first primary color, the second primary color, and the third primary color coincide with each other or overlap one another, the color mixture pattern subunit 14 cannot display the color of the white gray scale. Therefore, when the patterns of the first primary color, the second primary color and the third primary color in the color mixture pattern subunit 14 do not coincide with one another or do not overlap one another, a region having a maximal area can be obtained for displaying the color of the white gray scale.

Furthermore, black matrixes may also be disposed in the pattern subunit 11 of the first primary color, the pattern subunit 12 of the second primary color, the pattern subunit 13 of the third primary color and the color mixture pattern subunit 14, respectively. The black matrixes correspond to TFTs (Thin Film Transistor) on an array substrate assembly, respectively.

Thereby, a display apparatus can be formed by assembling the color filter substrate assembly 100 and an array substrate assembly together. The display apparatus may comprise any products or parts having display function, such as a liquid crystal panel, an electronic paper, an OLED (organic light-emitting device) panel, a mobile phone, a tablet computer, a TV, a display, a notebook computer, a digital frame, and a navigator.

Specifically, the display apparatus comprises a plurality of pixels. Each of the pixels comprises a first sub-pixel, a second sub-pixel, a third sub-pixel, and a fourth sub-pixel.

The first sub-pixel comprises the pattern subunit 11 of the first primary color in the color filter substrate assembly 100, the second sub-pixel comprises the pattern subunit 12 of the second primary color in the color filter substrate assembly 100, the third sub-pixel comprises the pattern subunit 13 of the third primary color in the color filter substrate assembly 100, and the fourth sub-pixel comprises the color mixture pattern subunit 14 in the color filter substrate assembly 100.

The color mixture pattern subunit 14 displays a color of a white gray scale, under the action of a drive voltage according to an additive color mixing principle, after the first primary color, the second primary color and the third primary color (i.e., three primary colors of red, green, and blue) in the color mixture pattern subunit 14 are mixed together, thereby increasing the transmittance. Therefore, the fourth sub-pixel comprising the color mixture pattern subunit 14 may serve as a transmittance increasing pixel, to increase the transmittance of the display apparatus.

In addition, embodiments of the present invention also provided a method of manufacturing the color filter substrate assembly 100, corresponding to the abovementioned color filter substrate assembly 100. The method comprises forming a color filter layer on a substrate.

Figure 2:
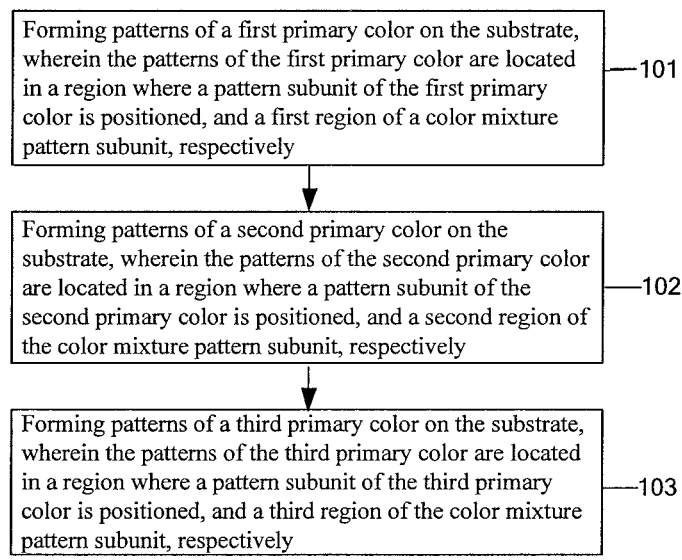
FIG. 2 is a schematic flow diagram of a method of manufacturing a color filter substrate assembly, according to an embodiment of the present invention.

Specifically, as shown in FIG. 2, the forming the color filter layer comprises:

a step 101 of forming patterns of a first primary color on the substrate, wherein the patterns of the first primary color are located in a region where a pattern subunit of the first primary color is positioned, and a first region of a color mixture pattern subunit, respectively.

As an example, referring to the color filter layer shown in FIG. 1, the patterns of the first primary color may be manufactured by using a mask patterning process. The patterns of the first primary color are located in the region where the pattern subunit 11 of the first primary color is positioned, and the first region 21 of the color mixture pattern subunit 14, respectively.

The forming the color filter layer further comprises: a step 102 of forming patterns of a second primary color on the substrate, wherein the patterns of the second primary color are located in a region where a pattern subunit of the second primary color is positioned, and a second region of the color mixture pattern subunit, respectively.

As an example, referring to the color filter layer shown in FIG. 1, the patterns of the second primary color may be manufactured by using the mask patterning process again. The patterns of the second primary color are located in the region where the pattern subunit 12 of the second primary color is positioned, and the second region 22 of the color mixture pattern subunit 14, respectively.

The forming the color filter layer further comprises: a step 103 of forming patterns of a third primary color on the substrate, wherein the patterns of the third primary color are located in a region where a pattern subunit of the third primary color is positioned, and a third region 23 of the color mixture pattern subunit, respectively, Similarly, referring to the color filter layer shown in FIG. 1, the patterns of the third primary color may be manufactured by using the mask patterning process again. The patterns of the third primary color are located in the region where the pattern subunit 13 of the third primary color is positioned, and the third region 23 of the color mixture pattern subunit 14, respectively.

In the embodiments, the first region 21, the second region 22, and the third region 23 of the color mixture pattern subunit 14 have the same size. In the embodiments, the first region 21, the second region 22, and the third region 23 of the color mixture pattern subunit 14 do not coincide with one another or do not overlap one another.

In this way, the color mixture pattern subunit 14 displays a color of a white gray scale after the first primary color, the second primary color and the third primary color (i.e., three primary colors of red, green, and blue) in the color mixture pattern subunit 14 are mixed together. Therefore, the color mixture pattern subunit 14 can generate a color of the white gray scale having certain gray scale value for increasing the transmittance, thereby increasing the transmittance of the display apparatus. Furthermore, since the pattern unit comprises only pattern subunits of primary colors consisting of the first primary color, the second primary color and the third primary color, only three patterning processes are needed to manufacture the abovementioned color filter substrate assembly 100, without any additional patterning processes for manufacturing the transmittance increasing pixel. As a result, the manufacturing process can be simplified while the production cost is decreased.

Furthermore, embodiments of the present invention also provide a display method for the display apparatus according to the abovementioned embodiments, corresponding to the abovementioned display apparatus. The display method comprises:

during driving of any pixel of the display apparatus, inputting a data signal for the first primary color to the first sub-pixel, inputting a data signal for the second primary color to the second sub-pixel, inputting a data signal for the third primary color to the third sub-pixel, and inputting a luminance increasing data signal to the fourth sub-pixel.

The luminance increasing data signal will cause the fourth sub-pixel to emit light of a white gray scale.

As an example, assuming that the first primary color is red color, the second primary color is green color, and the third primary color is blue color, referring to the color filter substrate assembly shown in FIG. 1, the display apparatus comprises pixels. Each of the pixels comprises a first sub-pixel, a second sub-pixel, a third sub-pixel, and a fourth sub-pixel. The first sub-pixel comprises the pattern subunit 11 of the first primary color, the second sub-pixel comprises the pattern subunit 12 of the second primary color, the third sub-pixel comprises the pattern subunit 13 of the third primary color, and the fourth sub-pixel comprises the color mixture pattern subunit 14.

In this case, a data signal for the red color may be inputted to the first sub-pixel, a data signal for the green color may be inputted to the second sub-pixel, a data signal for the blue color may be inputted to the third sub-pixel, and a luminance increasing data signal may be inputted to the fourth sub-pixel. The fourth sub-pixel comprises the color mixture pattern subunit 14 of the color filter substrate assembly 100, and the color mixture pattern subunit consists of the patterns of the first primary color, the second primary color and the third primary color. Therefore, the first sub-pixel in the display apparatus can display red color having certain gray scale value, the second sub-pixel in the display apparatus can display green color having certain gray scale value, the third sub-pixel in the display apparatus can display blue color having certain a gray scale value, and the fourth sub-pixel in the display apparatus can display white color having certain a gray scale value and emits light of a white gray scale, by means of reflection functions of the pattern subunit 11 of the first primary color, the pattern subunit 12 of the second primary color, the pattern subunit 13 of the third primary color, and the color mixture pattern subunit 14, or by means of the pattern subunit 11 of the first primary color, the pattern subunit 12 of the second primary color, the pattern subunit 13 of the third primary color, and the color mixture pattern subunit 14. As a result, the fourth sub-pixel can serve as a transmittance increasing pixel to increase the luminance.

Figure 3:
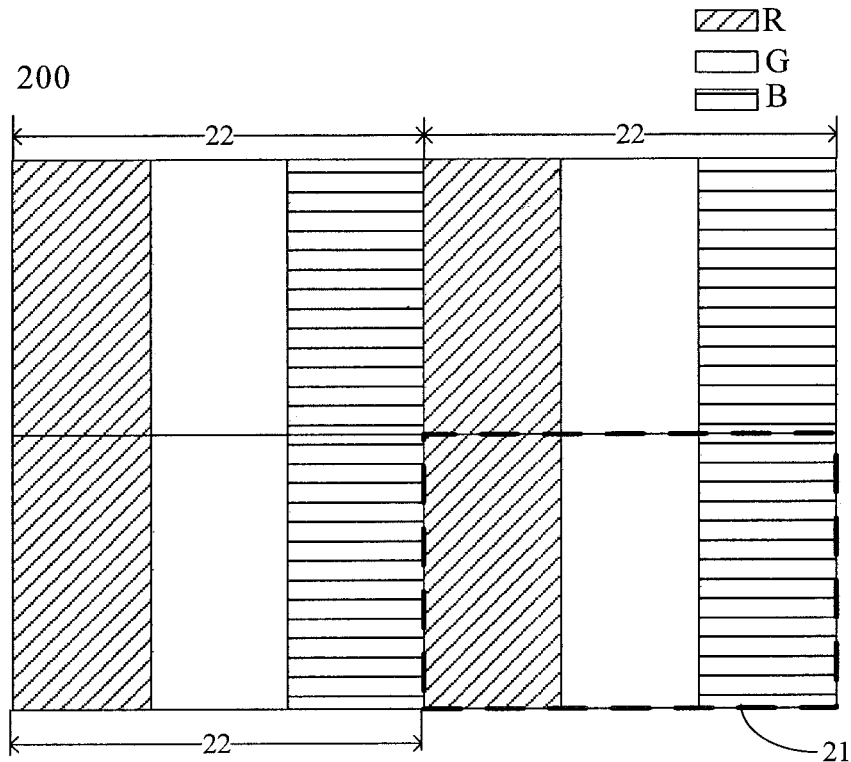
FIG. 3 is a schematic diagram of a display apparatus according to an example in the embodiment of the present invention.
Figure 4:
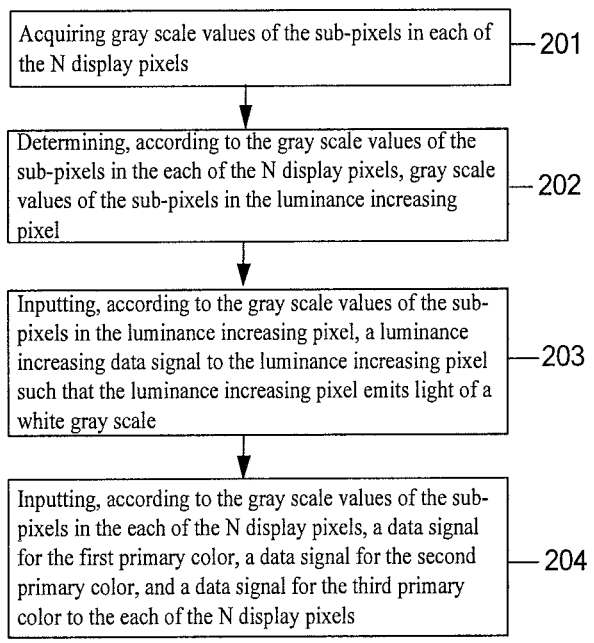
FIG. 4 is a schematic flow diagram of a display method according to an embodiment of the present invention.

In addition, embodiments of the present invention also provide a display method which may be used for the display apparatus 200 as shown in FIG. 3. As shown in FIG. 3, the display apparatus 200 comprises a plurality of pixel sets arranged repeatedly (one pixel set is taken as an example for explanation in FIG. 3). Each of the plurality of pixel sets comprises a luminance increasing pixel 21 and N display pixels 22 (three display pixels are taken as an example for explanation in FIG. 3, and N>0). Each of the luminance increasing pixel 21 and the display pixels 22 consists of a sub-pixel of a first primary color, a sub-pixel of a second primary color, and a sub-pixel of a third primary color. Assuming that the first primary color is red color, the second primary color is green color, and the third primary color is blue color, specifically, during driving of any one of the plurality of pixel sets in the display apparatus 200, as shown in FIG. 4, the display method comprises:

a step 201 of acquiring gray scale values of the sub-pixels in each of the N display pixels;

a step 202 of determining, according to the gray scale values of the sub-pixels in the each of the N display pixels, gray scale values of the sub-pixels in the luminance increasing pixel;

a step 203 of inputting, according to the gray scale values of the sub-pixels in the luminance increasing pixel, a luminance increasing data signal to the luminance increasing pixel such that the luminance increasing pixel emits light of a white gray scale; and a step 204 of inputting, according to the gray scale values of the sub-pixels in the each of the N display pixels, a data signal for the first primary color, a data signal for the second primary color, and a data signal for the third primary color to the each of the N display pixels.

The gray scale values of the sub-pixels in the luminance increasing pixel 21 are equal to one another. In other words, in the luminance increasing pixel 21, the gray scale value of the sub-pixel of the first primary color, the gray scale value of the sub-pixel of the second primary color, and the gray scale value of the sub-pixel of the third primary color are equal to one another.

As shown in FIG. 3, the luminance increasing pixel 21 displays a color of a white gray scale and emits light of the white gray scale, based on an additive color mixing principle, after the three primary colors in the luminance increasing pixel 21 of each pixel set are mixed together, thereby increasing the transmittance. Furthermore, the transmittance of the display apparatus 200 can be increased, without changing a manufacturing process of the display apparatus 200.

Specifically, the step 202 may specifically comprise the steps of:

firstly, calculating, according to the gray scale values of the sub-pixels in all of the N display pixels, a gray scale value of the first primary color, a gray scale value of the second primary color, and a gray scale value of the third primary color in the N display pixels, respectively;

next, determining that the gray scale values of the sub-pixels in the luminance increasing pixel are equal to a minimum (or a least one) among the gray scale values of the sub-pixels in all of the N display pixels if a difference between any two of the gray scale value of the first primary color, the gray scale value of the second primary color and the gray scale value of the third primary color is greater than a first threshold value; determining that the gray scale values of the sub-pixels in the luminance increasing pixel are equal to a maximum (or a greatest one) among the gray scale values of the sub-pixels in all of the N display pixels if the difference between any two of the gray scale value of the first primary color, the gray scale value of the second primary color and the gray scale value of the third primary color is less than a second threshold value; and determining that the gray scale values of the sub-pixels in the luminance increasing pixel are equal to a third threshold value if the difference between any two of the gray scale value of the first primary color, the gray scale value of the second primary color and the gray scale value of the third primary color is greater than the second threshold value and is less than the first threshold value, wherein the first threshold value is greater than the second threshold value.

As an example, one pixel set shown in FIG. 3 is taken as an example. The gray scale values of the sub-pixel of the first primary color, the sub-pixel of the second primary color and the sub-pixel of the third primary color in the luminance increasing pixel 21 are set to be R1, G1, B1, respectively, and R1=G1=B1.

Each of the three display pixels 22 in the pixel set consists of the sub-pixel of the first primary color, the sub-pixel of the second primary color and the sub-pixel of the third primary color. Hence, three groups of gray scale values of the three primary colors, i.e. R2, G2, and B2; R3, G3, and B3; and R4, G4, and B4, can be obtained.

Thereby, the gray scale value (R=R2+R3+R4) of the first primary color (red color), the gray scale value (G=G2+G3+G4) of the second primary color (green color), and the gray scale value (B=B2+B3+B4) of the third primary color (blue color) in the three display pixels can be calculated, respectively.

In this case, if |R−G| or | R−B| or |G−B|>N, where N is the first threshold value, it is determined that, in the luminance increasing pixel 21, R1=G1=B1=min (R2, R3, R4, G2, G3, G4, B2, B3, B4);

if |R−G| or |R−B| or |G−B|<M, where M is the second threshold value, it is determined that, in the luminance increasing pixel 21, R1=G1=B1=max (R2, R3, R4, G2, G3, G4, B2, B3, B4);

if M<|R−G| or |R−B| or |G−B|<N, it is determined that, in the luminance increasing pixel 21, R1=G1=B1=the third threshold value=(a+b+c)*(a*(R2+R3+R4)+b*(G2+G3+G4)+c*(B2+B3+B4)), where a, b, and c are luminance coefficients of the red color, the green color, and the blue color in the display apparatus 200, respectively. In addition, values of N and M may be set by those skilled in the art according to actual situations. For example, N≥100, and M≤50, or the like. Alternatively, the values of N and M may specifically be determined according to a luminance and a contrast of each of the display pixels 22 in the pixel set. For example, a functional relationship between N and the luminance of each of the display pixels 22, or a functional relationship between M and the contrast of each of the display pixels 22, may be established. The values of N and M are not limited in the embodiments of the present invention. The first threshold value is greater than the second threshold value.

Thus, the gray scale values of the sub-pixels in the luminance increasing pixel 21 may be determined according to the gray scale values of the sub-pixels in each of the N display pixels 22.

Thereby, according to the gray scale values R1, G1, and B1 of the sub-pixels in the luminance increasing pixel 21, a luminance increasing data signal may be inputted to the luminance increasing pixel 21 such that the luminance increasing pixel 21 emits light of a white gray scale.

Meanwhile, according to the gray scale values of the sub-pixels in each of the three display pixels 22, a data signal for the first primary color, a data signal for the second primary color, and a data signal for the third primary color may also be inputted to each of the three display pixels 22.

In this way, during displaying of one pixel set, the luminance increasing pixel 21 in the pixel set displays a color of a white gray scale and thus can increase the transmittance. As a result, the transmittance of the display apparatus 200 can be increased, without changing a manufacturing process of the display apparatus 200.

Figure 5:
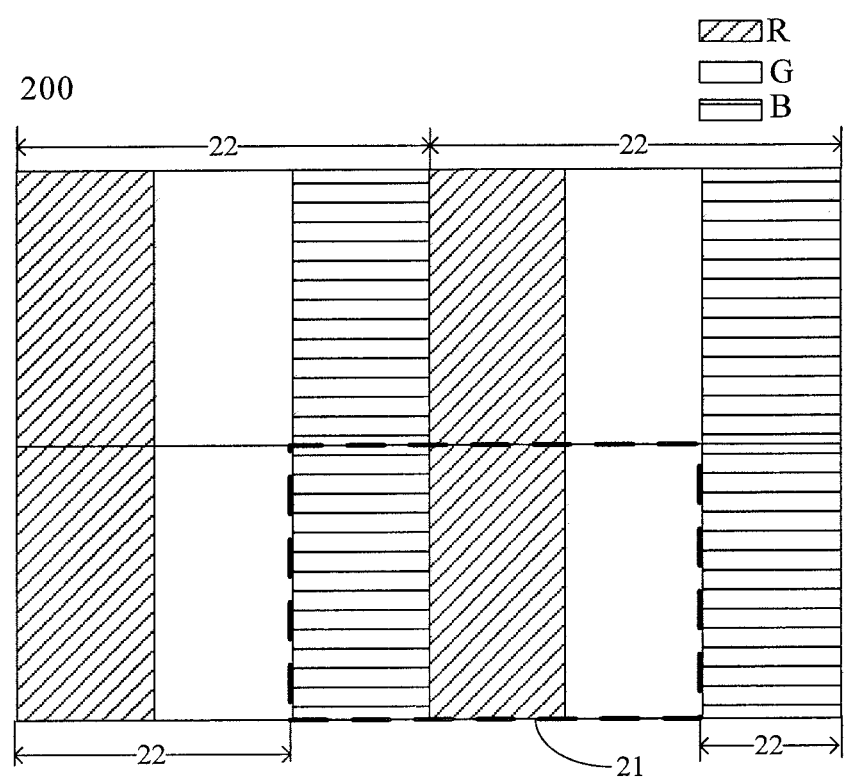
FIG. 5 is a schematic diagram of a display apparatus according to another example in the embodiment of the present invention.

In addition, it should be noted that, the positions and the numbers of the luminance increasing pixels 21 and the display pixels 22 are not limited to those shown in FIG. 3. It should be appreciated that, the luminance increasing pixel 21 may consist of any sub-pixels of the first, second and third primary colors. As shown in FIG. 5, the luminance increasing pixel 21 still consists of the sub-pixel of the first primary color, the sub-pixel of the second primary color and the sub-pixel of the third primary color, but may optionally vary in position.

So far, the embodiments of the present invention provide a color filter substrate assembly and a manufacturing method thereof, and a display apparatus and a display method thereof. The color filter substrate assembly comprises a color filter layer comprising pattern units arranged in an array. Each of the pattern units comprises: a pattern subunit of a first primary color, a pattern subunit of a second primary color, a pattern subunit of a third primary color and a color mixture pattern subunit which are arranged in sequence. The color mixture pattern subunit consists of patterns of the first primary color, the second primary color and the third primary color, and the patterns of the first primary color, the second primary color and the third primary color do not completely overlap or are not completely coincident. In this way, since the first primary color, the second primary color and the third primary color (i.e., the three primary colors of red, green, and blue) are mixed into a color of a white gray scale, the color mixture pattern subunit can generate a color of the white gray scale for increasing the transmittance, thereby increasing the transmittance of the display apparatus. In addition, since the pattern unit comprises only the pattern subunits of the primary colors consisting of the first primary color, the second primary color and the third primary color, it is not necessary to add a patterning processes to manufacture the transmittance increasing pixel. As a result, the manufacturing process can be simplified while the production cost is decreased.

The embodiments of the present invention provide a color filter substrate assembly and a manufacturing method thereof, and a display apparatus and a display method thereof. The color filter substrate assembly comprises a color filter layer comprising pattern units arranged in an array. Each of the pattern units comprises: a pattern subunit of a first primary color, a pattern subunit of a second primary color, a pattern subunit of a third primary color and a color mixture pattern subunit which are arranged in sequence. The color mixture pattern subunit consists of patterns of the first primary color, the second primary color and the third primary color, and the patterns of the first primary color, the second primary color and the third primary color do not completely overlap or are not completely coincident. In this way, since the first primary color, the second primary color and the third primary color (i.e., the three primary colors of red, green, and blue) are mixed into a color of a white gray scale, the color mixture pattern subunit can generate light of the white gray scale for increasing the transmittance, thereby increasing the transmittance of the display apparatus. In addition, since the pattern unit comprises only the pattern subunits of the primary colors consisting of the first primary color, the second primary color and the third primary color, it is not necessary to add a patterning processes to manufacture the transmittance increasing pixel. As a result, the manufacturing process can be simplified while the production cost is decreased.

In the description, specific features, structures, materials or characteristics may be combined in appropriate manners in any one or more embodiments or examples.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A display method for a display apparatus, wherein:
the display apparatus comprises a plurality of pixel sets, and each of the plurality of pixel sets comprises a luminance increasing pixel and N display pixels, wherein each of the luminance increasing pixel and the N display pixels consists of a sub-pixel of a first primary color, a sub-pixel of a second primary color and a sub-pixel of a third primary color, and N>0,
during driving of any one of the plurality of pixel sets, the display method comprising:
acquiring gray scale values of the sub-pixels in each of the N display pixels;
determining, according to the gray scale values of the sub-pixels in the each of the N display pixels, gray scale values of the sub-pixels in the luminance increasing pixel;
inputting, according to the gray scale values of the sub-pixels in the luminance increasing pixel, a luminance increasing data signal to the luminance increasing pixel such that the luminance increasing pixel emits light of a white gray scale; and
inputting, according to the gray scale values of the sub-pixels in the each of the N display pixels, a data signal for the first primary color, a data signal for the second primary color and a data signal for the third primary color, to the each of the N display pixels;
wherein
the gray scale values of the sub-pixels in the luminance increasing pixel are equal to one another;
the determining the gray scale values of the sub-pixels in the luminance increasing pixel comprises:
calculating, according to the gray scale values of the sub-pixels in all of the N display pixels, a gray scale value of the first primary color, a gray scale value of the second primary color and a gray scale value of the third primary color in the N display pixels, respectively;
determining that the gray scale values of the sub-pixels in the luminance increasing pixel are equal to a minimum among the gray scale values of the sub-pixels in all of the N display pixels if a difference between any two of the gray scale value of the first primary color, the gray scale value of the second primary color and the gray scale value of the third primary color is greater than a first threshold value;
determining that the gray scale values of the sub-pixels in the luminance increasing pixel are equal to a maximum among the gray scale values of the sub-pixels in all of the N display pixels if the difference between any two of the gray scale value of the first primary color, the gray scale value of the second primary color and the gray scale value of the third primary color is less than a second threshold value; and determining that the gray scale values of the sub-pixels in the luminance increasing pixel are equal to a third threshold value if the difference between any two of the gray scale value of the first primary color, the gray scale value of the second primary color and the gray scale value of the third primary color is greater than the second threshold value and is less than the first threshold value, and the first threshold value is greater than the second threshold value.

2. The display method of claim 1, wherein:

the first primary color, the second primary color, and the third primary color are red, green, and blue, respectively.

* * * * *